(12) United States Patent
Born et al.

(10) Patent No.: US 6,448,338 B1
(45) Date of Patent: Sep. 10, 2002

(54) HOT-SETTING WASH-FAST SEALANT FOR SHELL STRUCTURES

(75) Inventors: Peter Born, Sandhausen; Klaus Hoellriegel, Wiesenbach, both of (DE)

(73) Assignee: Henkel Teroson GmbH, Heidelberg (DE)

( * ) Notice: Subject to any disclaimer, the term of this patent is extended or adjusted under 35 U.S.C. 154(b) by 0 days.

(21) Appl. No.: 09/462,938

(22) PCT Filed: Jul. 7, 1998

(86) PCT No.: PCT/EP98/04209

§ 371 (c)(1),
(2), (4) Date: Mar. 28, 2000

(87) PCT Pub. No.: WO99/03946

PCT Pub. Date: Jan. 28, 1999

(30) Foreign Application Priority Data

Jul. 16, 1997 (DE) .......................................... 197 30 425

(51) Int. Cl.$^7$ ............................. C09K 3/10; C09J 23/08; C08L 23/08
(52) U.S. Cl. .................... 525/193; 525/193; 427/385.5; 427/388.2
(58) Field of Search ................................ 525/194, 193; 427/385.5, 388.2

(56) References Cited

U.S. PATENT DOCUMENTS

| | | | |
|---|---|---|---|
| 4,062,715 A | 12/1977 | Manner et al. | 156/334 |
| 4,210,567 A | 7/1980 | Koesters | 260/31.8 R |
| 4,374,223 A | * 2/1983 | van Raamsdonk et al. | 524/245 |
| 4,829,094 A | 5/1989 | Melber et al. | 521/57 |
| 5,356,994 A | 10/1994 | Koch | 525/98 |
| 5,668,209 A | 9/1997 | Ruch et al. | 524/555 |
| 5,684,089 A | 11/1997 | Lanoye et al. | 525/237 |
| 5,919,857 A | 7/1999 | Ruch et al. | 524/555 |
| 5,965,645 A | 10/1999 | Ruch et al. | 524/197 |
| 6,004,425 A | * 12/1999 | Born et al. | 525/194 |
| 6,103,389 A | * 8/2000 | Tanaka et al. | 428/500 |

FOREIGN PATENT DOCUMENTS

| | | |
|---|---|---|
| CA | 1 248 271 | 1/1989 |
| CA | 2 000 569 | 4/1990 |
| CA | 1 305 806 | 7/1992 |
| DE | 17 69 325 | 5/1972 |
| DE | 22 00 022 | 7/1973 |
| DE | 22 39 067 | 2/1974 |
| DE | 24 54 235 | 5/1976 |
| DE | 35 23 480 | 1/1987 |
| DE | 38 34 818 | 11/1989 |
| DE | 40 34 725 | 5/1992 |
| DE | 41 20 502 | 12/1992 |
| DE | 41 22 849 | 1/1993 |
| DE | 43 15 191 | 12/1994 |
| DE | 44 35 803 | 4/1996 |
| DE | 196 44 855 | 5/1998 |
| EP | 0 973 394 | 1/1984 |
| EP | 0 181 441 | 5/1986 |
| EP | 0 309 903 | 4/1989 |
| EP | 0 309 904 | 4/1989 |
| EP | 0 356 715 | 3/1990 |
| JP | 01 022948 | 1/1989 |
| JP | 07 157735 | 6/1995 |
| WO | WO92/20465 | 11/1992 |

OTHER PUBLICATIONS

Database WPI, AN89–071726, XP002084904.
Database WPI, AN95–252482, XP002084905.

\* cited by examiner

*Primary Examiner*—D. R. Wilson
(74) *Attorney, Agent, or Firm*—Stephen D. Harper; Daniel S. Ortiz

(57) ABSTRACT

Hot-pumpable, heat-curing compositions based on solid ethylene/vinyl acetate copolymers and liquid reactive plasticizers containing olefinically unsaturated double bonds and at least one peroxidic crosslinking agent are suitable as sealing compounds for sealing fine and rough seams in vehicle manufacture. By adding expanding agents, the compositions may be used as lining adhesives. The preferred applications are at the white-shell stage of car manufacture.

19 Claims, No Drawings

HOT-SETTING WASH-FAST SEALANT FOR SHELL STRUCTURES

This application is filed under 35 U.S.C. 371 and based on PCT/EP98/04209, filed Jul. 7, 1998.

BACKGROUND OF THE INVENTION

1. Field of the Invention

This invention relates to hot-pumpable, heat-curing compositions based on ethylene/vinyl acetate copolymers (EVA), to their use as sealing compounds or lining adhesives, to a process for sealing seams in vehicle manufacture and to a process for lining sandwich components in vehicle manufacture.

2. Discussion of Related Art

In machine construction, vehicle construction or equipment manufacture and particularly in car manufacture, the metal components are, for the most part, still mechanically assembled and fixed at the so-called white-shell stage. Conventional fixing methods include riveting, screwing or welding, particularly spot welding, and flanging processes. The seams between the parts thus joined have to be sealed against penetrating water, dust and the like. Conventional compounds for sealing these seams are based either on plastisols or on rubber compositions. In car manufacture, sealing is increasingly being carried out at the so-called white-shell stage for manufacturing reasons, i.e. the sealing compounds are generally applied to the uncleaned metal surface. The surfaces are often coated with various corrosion inhibiting oils or drawing oils so that the sealing compounds used thereon should not be functionally affected by these oils. The sealants are cured at a later stage in the paint drying ovens. Before curing, the joined and sealed parts pass through cleaning, phosphating and dip-priming stages. The treatment compositions used in those stages are capable of flushing the sealants from the joints. For this reason, all sealants or sealing compounds or adhesives used at the white-shell stage of vehicle manufacture are required to be resistant to washing. Hitherto, these requirements have been satisfied by various procedures including, for example, thermal/inductive precuring or pregelation of low-viscosity paste-form adhesives/sealants or sealing compositions based on plastisols. These plastisols may be PVP plastisols of the type described, for example, in DE-A-1769325 or in DE-A-2200022, although (meth)acrylate plastisols of the type described, for example, in DE-A-2454235 or DE-A-3523480 may also be used. The styrene-copolymer-based plastisols disclosed in DE-A4034725 and in DE-A-4315191 are also mentioned in this regard. Separate equipment is required for the precuring or pregelation step necessitated by the use of plastisols. In general, the equipment in question consists of special induction heaters or hot-air or infrared heaters. Besides the additional investment involved, this procedure has another disadvantage. On account of the short cycle times, the pregelation step has to be carried out by so-called heat shock so that the surfaces of the metal parts briefly assume very high temperatures. This can lead to cracking of the corrosion-inhibiting and drawing oils applied to the metal surfaces.

Rubberbased sealants and sealing compounds which are applied hot are also known. After cooling to ambient temperature, these compounds/compositions have such a high intrinsic viscosity that they are resistant to washing a few minutes after application. Hot-applied rubber compositions are widely used as adhesives, sealants and sealing compounds at the white-shell stage of car manufacture. These compositions contain rubbers, more particularly vulcanizable rubbers based on 1,4-polybutadienes and/or 1,4-polyisoprenes. The compositions preferably contain liquid polydienes of low molecular weight, sulfur and optionally accelerators for sulfur vulcanization. The compositions may additionally contain high molecular weight, so-called solid rubber, both the liquid polydienes and the solid rubber optionally containing functional groups such as, for example, hydroxyl groups, carboxyl groups, anhydride groups or epoxy groups. The use of these rubber compositions as adhesives/sealants is the subject of a number of patent applications, cf. for example EP-A-97394, EP-A-309903, EP-A-309904, DE-A-3834818, DE-A-4120502, DE-A-4122849 and EP-A-356715. Unfortunately, the rubber compositions in question have a very tacky surface and can very easily be deformed by mechanical pressure before they are cured in the paint drying ovens. This is a major disadvantage above all where they are used for fitted parts, such as for example doors, bonnets or boot lids, because such parts often have to be stacked and stored during the manufacturing process. The tacky surface binds very large quantities of dust and soil and the fact that the rubber compositions can easily be mechanically deformed often leads to handling marks on the visible part of seams in particular so that the appearance of the sealed joint is adversely affected.

Attempts have been made to solve some of the problems mentioned above by using two-component rubber systems. Thus, EP-A-181441 describes a two-component system consisting of a hydroxyfunctional 1,3-polybutadiene and a second component which consists of a polymer based on 1,3-butadiene and which contains lateral succinic anhydride groups. EP-A-356715 describes a two-component system consisting of a polymer A containing at least two hydroxyl groups per macromolecule and of a second component which is compatible with component A and which contains on average at least two carboxyl groups or carboxylic anhydride groups per molecule. Through the use of suitable catalysts, these two-component materials can develop a certain strength at room temperature through the esterification reaction alone. Ultimate strength is developed by an additionally incorporated sulfur vulcanization system during vulcanization in the paint drying ovens. However, these two-component systems only develop adequate resistance to pressure and handling about 30 minutes after application. This means that the corresponding parts can only be further processed some 30 minutes after application of the two-component system. In addition, two-component systems, particularly those of high viscosity, require elaborate metering and mixing units to be able to guarantee a reasonably dependable level of process safety.

Although conventional hotmelt adhesive compositions—through their rapid build up of strength after cooling—would enable corresponding sealing compounds rapidly to develop resistance to pressure and handling, these hotmelt adhesives have two major disadvantages:

they require very high application temperatures on account of their thermoplastic character, they soften and flow at the temperatures prevailing in the paint drying ovens so that they would flow out from the joint.

Accordingly, the problem addressed by the present invention was to provide hot-pumpable heat-curing compositions which could be directly applied to uncleaned surfaces at the white-shell stage of car manufacture and which, when used as sealing compounds, would have adequate resistance to pressure and handling only a short time after application so that the corresponding parts could be immediately further processed. In addition, these sealing compounds would have a tack-free surface so that they would not attract dust or soil. In addition, a tack-free surface of the sealing compounds would ensure that machinery and equipment in which car parts thus sealed are further processed would not be contaminated by the sealing compounds. In addition, the binder system would be formulated in such a way that curing or crosslinking of the sealing compound could take place even over the broad temperature ranges encountered in the stoving phase of electrophoretic coating in car manufacture. In addition, it would have to be guaranteed that the cured sealing compound would have an attractive smooth surface because the corresponding joints are often visible. For reasons of corrosion control, no pores or open bubbles should occur. In addition, the surfaces would be required to lend themselves to coating with conventional automotive lacquers.

DESCRIPTION OF THE INVENTION

The solution to the problem stated above is defined in the claims and lies essentially in the use of heat-curing compositions containing at least one solid ethylene/vinyl acetate copolymer (EVA copolymer) with a softening point above 50° C., as measured by the ring and ball method according to ASTM-E-28, at least one liquid reactive plasticizer containing olefinically unsaturated double bonds and at least one peroxidic crosslinking agent.

Although the use of plasticizers in peroxide-containing ethylene/vinyl acetate copolymer compositions is known in principle, manufacturers of EVA copolymers point out that only high saturated products are suitable for this purpose because they have no effect on peroxide vulcanization. According to the manufacturers, paraffinic mineral oils with very little unsaturation (olefinic double bonds) are particularly suitable as plasticizers. In addition, adipate and sebacate plasticizers, for example adipic acid benzyl octyl ester (Adimoll BO) and alkyl sulfonic acid esters of phenol (Mesamoll), are also specifically recommended.

To obtain the character of a hotmelt adhesive, the sealing compounds according to the invention contain EVA copolymers which are solid at room temperature, i.e. they must have a softening point of 50° C. as measured by the ring and ball method according to ASTM-E-28. The EVA copolymers are used in quantities of 4 to 40% by weight and preferably 7 to 33% by weight in the sealing compounds according to the invention.

In order to make the sealing compounds hot-pumpable with the applicators typically used in car manufacture and at the necessary pressures, the EVA copolymers have to be plasticized. The expression "hot-pumpable" in the context of the present invention is intended to mean that the sealing compounds have a sufficiently low viscosity at temperatures of 60 to 110° C. and preferably at temperatures of 70 to 100° C. to be able to be processed with the usual pumps, feed systems and applicators.

Liquid rubbers from the following group of homopolymers and/or copolymers may be used as liquid reactive plasticizers containing olefinically unsaturated double bonds: polybutadienes, more particularly 1,4-, 1,3- and 1,2-polybutadiene, polyisoprenes, styrene/butadiene copolymers and butadiene/acrylonitrile copolymers, these polymers preferably at least partly containing terminal and/or (statistically distributed) lateral functional groups. Examples of such functional groups are hydroxy, carboxyl, carboxylic anhydride, epoxy or amino groups. The molecular weight of these liquid diene homopolymers and/or copolymers is typically below 20,000 and preferably between 1,000 and 10,000. The liquid rubbers are present in the compositions according to the invention in quantities of 5 to 40% by weight and preferably in quantities of 14 to 35% by weight. The rheology of the compositions as a whole is influenced to a large extent by the ratio of liquid rubbers to EVA copolymers, so that the flow behavior of the compositions can be varied within wide limits through that ratio. Accordingly, it is possible to produce both extrudable and sprayable sealing compounds.

In addition to the polydienes mentioned above, other compounds containing olefinically unsaturated double bonds may also be used and include, in particular, high-boiling (meth)acrylates, more particularly pentyl (meth)acrylate, isoamyl (meth)acrylate, hexyl (meth)acrylate, cyclohexyl (meth)acrylate, 2-ethylhexyl (meth)acrylate and the corresponding octyl, 3,5,5-trimethyl hexyl, decyl, dodecyl, hexadecyl, octadecyl and octadecenyl (meth)acrylates and the corresponding esters of maleic, fumaric, tetrahydrophthalic, crotonic, isocrotonic, vinyl acetic and itaconic acid. (Meth)acrylates containing more than one double bond per molecule are preferably used. Examples of such (meth)acrylates are ethylene glycol di(meth)acrylate, diethylene glycol di(meth)acrylate, propylene glycol di(meth)acrylate, trimethylene glycol di(meth)acrylate, neopentyl glycol di(meth)acrylate, 1,3-butylene glycol di(meth)acrylate, 1,4-butylene glycol di(meth)acrylate, 1,6-hexamethylene glycol di(meth)acrylate, 1,10-decamethylene glycol di(meth)acrylate, trimethylol propane tri(meth)acrylate, pentaerythritol tetra(meth)acrylate or pentaerythritol tri(meth)acrylate. The acrylic and methacrylic acid salts of divalent metals are also suitable. Examples include the corresponding zinc diacrylates and zinc dimethacrylates. The reactive (meth)acrylate compounds mentioned above are used in quantities of 1 to 10% by weight and preferably in quantities of 3 to 6% by weight.

The following factors are important as selection criteria for the peroxidic crosslinking agents:

the peroxides must have sufficient stability under pumping conditions, i.e. at temperatures of about 70 to 120° C., to ensure that no significant curing reaction takes place under such temperature and application conditions, at the temperatures prevailing in the stoving phase of electrophoretic coating, i.e. at temperatures of 160 to 240° C., the decomposition rate of the peroxides must be sufficiently rapid to guarantee crosslinking of the sealing compound in 15 to 30 minutes (residence time in the stoving oven).

Examples of suitable peroxides are tert.butyl cumyl peroxide, di-(2-tert.butylperoxypropyl)-(2)-benzene, dicumyl peroxide, ethyl-3,3-di(tert.butylperoxy)-butyrate, n-butyl-4,4'-di-(tert.butylperoxy)-valerate, tert.butylperoxy benzoate, tert.butyl hydroperoxide, cumene hydroperoxide, 1,1,3,3-tetramethyl butyl hydroperoxide and 2,5-dimethyl-2,5-di-(tert.butylperoxy-hexine)-3.

The quantities in which the peroxides are used are governed by the criteria mentioned above and are between 0.1 and 5% by weight and preferably between 0.5 and 1.5% by weight.

In addition, the compositions according to the invention may contain so-called kickers or activators which accelerate peroxide crosslinking, for example aromatic amines and metal oxides, such as zinc oxide. Where activators are used, they are employed in quantities of up to 6% by weight and preferably 2 to 4% by weight.

Conventional stabilizers may be used to protect the compositions according to the invention against thermal, thermo-oxidative, ozone or hydrolytic degradation. Examples of conventional stabilizers are the sterically hindered phenols or amine derivatives and, more particularly, carbodiimide stabilizers and polycarbodiimide derivatives which are preferably used in the form of a master batch in an EVA copolymer. The stabilizers in question are used in quantities of up to 5% by weight and preferably in quantities of 1 to 3% by weight.

The fillers may be selected from various materials including, in particular, chalks, natural or ground calcium carbonates, silicates, more particularly aluminium silicates or magnesium aluminium silicates or magnesium alkali metal aluminium silicates, or even talcum or graphite or carbon black. The quantity in which the fillers are used may vary within wide limits, typical ranges being from 20 to 70% by weight and preferably from 40 to 50% by weight. To produce sealing materials of low specific gravity, the fillers may also be partly replaced by hollow plastic microbeads which may be used either in pre-expanded form or in the compact form in which they only expand during curing of the sealing compound in the paint drying oven. Hollow microbeads of the type in question are disclosed, for example, in EP-A-586541 and in U.S. Pat. No. 4,829,094.

In addition, the compositions according to the invention may contain pigments, for example titanium dioxide, iron oxides or pigment-quality carbon blacks. The pigments mentioned are used in the formulation in quantities of up to 5% by weight and preferably in quantities of 1 to 3% by weight. To reduce sensitivity to moisture, it may be advisable to incorporate water-binding agents, more particularly calcium oxide, in the formulations in quantities of 1 to 10% by weight. Quantities of 3 to 5% by weight of calcium oxide are preferably used.

To improve coating of the sealing compounds with paints applied by electrophoretic deposition, the compositions may contain graphite in known manner in quantities of 5 to 15% by weight and preferably in quantities of 25 to 35% by weight instead of the pigments and fillers mentioned.

Where the compositions according to the invention are used as a lining adhesive for lining sandwich parts, they may also contain expanding agents from the class of azo compounds, N-nitroso compounds, sulfonyl hydrazides or sulfonyl semicarbazides. Azo-bis-isobutyronitrile and, in particular, azodicarbonamide are mentioned as examples of azo compounds suitable for use in accordance with the invention. Dinitrosopentamethylene tetramine is mentioned as an example of a suitable nitroso compound, 4,4'-hydroxy-bis-(benzenesulfonic acid hydrazide), diphenyl sulfone-3,3'-disulfohydrazide and benzene-1,3-disulfohydrazide are mentioned as examples of sulfohydrazides and p-toluene sulfonyl semicarbazide is mentioned as an example of a semicarbazide. Instead of the expanding agents mentioned above, however, it is also possible to use non-expanded hollow microbeads which, in their non-expanded form, are known to consist of thermoplastic polymer powders impregnated or filled with low-boiling organic liquids. For use as a lining adhesive, these compositions should expand by about 20% to about 250% in volume during curing. Potential applications for such lining adhesives are the following sandwich structures in car manufacture: roof bows with an outer roof skin, bonnet or boot lids with reinforcing frames, steel sliding roofs with reinforcing frames, inner door and outer door panels, window channel reinforcement with outer door panels, side impact crash bars against outer door panels. Expansion of the lining adhesive ensures that, despite the thermal expansion of the panels or in the event of movement of the panels under the effect of heat in the paint drying oven and despite manufacturing tolerances, wetting of the second substrate with the lining adhesive is guaranteed. The expanding agents mentioned above are used in quantities of up to 3% by weight and preferably in quantities of 0.5 to 1.5% by weight.

Depending on the substrate to be sealed, it may be necessary to use adhesion promoters or tackifying resins known per se in the composition according to the invention. Suitable adhesion promoters or tackifiers are mentioned, for example, in DE-A-19644855, pages 8/9. They may be used in quantities of up to 10% by weight and preferably in quantities of 3 to 5% by weight.

The following Examples are intended to illustrate the invention without limiting its scope in any way.

In an evacuable laboratory kneader, the compositions shown below were mixed until they were homogeneous. In the Examples, all parts are parts by weight, unless otherwise indicated.

| Example | 1 | 2 | 3 | Comparison |
|---|---|---|---|---|
| EVA, 39% vinyl acetate[1] | 32.61 | 32.61 | 32.61 | 32.61 |
| Talcum, <45 μm particle size | 40.76 | 40.76 | 40.76 | 40.76 |
| Lamp black, bead-form | 0.91 | 0.91 | 0.91 | 0.91 |
| Calcium oxide <0.1 mm particle size | 3.62 | 3.62 | 3.62 | 3.62 |
| Trimethylol propane trimethacrylate | 3.62 | 3.62 | 3.62 | 3.62 |
| 2,5-Dimethyl-2,5-di-(tert.butylperoxyhexyne)-3 (45%) | 1.27 | 1.27 | 1.27 | 1.27 |
| Polycarbodiimide/EVA copolymer | 1.82 | 1.82 | 1.82 | 1.82 |
| Diphenylamine derivative (70% amine/30% silica) | 0.91 | 0.91 | 0.91 | 0.91 |
| Liquid polybutadiene[2] | 14.48 | | | |
| Liquid polybutadiene, OH-functional[3] | | 14.48 | | |
| Liquid polybutadiene, MA derivative[4] | | | 14.48 | |
| Dioctyl adipate (DOA) | | | | 14.48 |
| Surface condition after application[5] | Smooth, dust-dry | Smooth, dust-dry | Smooth, dust-dry | Smooth, dust-dry |
| Initial adhesion to oiled steel[6] | Cohesive failure | Cohesive failure | Cohesive failure | Cohesive failure |
| Adhesion after curing, 30 mins./180° C. | Cohesive failure | Cohesive failure | Cohesive failure | Cohesive failure |
| Adhesion after curing, 30 mins./180° C. + 10 mins./230° C. | Cohesive failure | Cohesive failure | Cohesive failure | Cohesive failure |
| Surface condition after curing, 30 mins./180° C. | Compact, smooth, dry | Compact, smooth, dry | Compact, smooth, dry | Bubbles, craters, dry |
| Surface condition after 30 mins./180° C. + 30 mins./230° C.[7] | Compact, smooth, dry | Compact, smooth, dry | Compact, smooth, dry | Many bubbles, "pimples" |

Remarks:
[1]Melt index 60
[2]Cis-1,4-polybutadiene ca. 72%, MW ca. 1800
[3]Polybutadiene with predominantly terminal OH groups, MW ca. 2800
[4]Polybutadiene/maleic anhydride adduct with statistically distributed succinic anhydride groups, MW ca. 1700, ca. 7.5 anhydride units per molecule
[5]Material temperature on application ca. 80° C., condition after cooling
[6]Bodywork steel ST 1405 oiled with ASTM Oil No. 1 before stoving
[7]Corresponds to overstoving cycle

EXAMPLE 4

This is an example of an expanding lining adhesive:

| | |
|---|---|
| EVA, 39% vinyl acetate[1] | 22.61 |
| Talcum, <45 μm particle size | 43.17 |
| Lamp black, bead-form | 0.91 |
| Calcium oxide <0.1 mm particle size | 3.62 |
| Trimethylol propane trimethacrylate | 3.62 |
| 2,5-Dimethyl-2,5-di-(tert.butylperoxyhexyne)-3 (45%) | 1.27 |
| Polycarbodiimide/EVA copolymer | 0.91 |
| Diphenylamine derivative (70% amine/30% silica) | 0.91 |
| Zinc oxide | 3.00 |
| Azodicarbonamide | 0.50 |
| Liquid polybutadiene, MA derivative[2] | 19.48 |

Remarks:
[1]Melt index 60
[2]Polybutadiene/maleic anhydride adduct with statistically distributed succinic anhydride groups, MW ca. 1700, ca. 15 anhydride units per molecule The following Examples largely correspond to Examples 1 to 3, the main difference lying in viscosity. The compositions in question are low-viscosity compositions which are suitable for sealing seams and which are therefore sprayable.

| | Example | |
|---|---|---|
| | 5 | 6 |
| EVA, 39% vinyl acetate[1] | 7.61 | 17.51 |
| Talcum, <45 μm particle size | 46.62 | 47.60 |
| Lamp black, bead-form | 0.91 | 0.91 |
| Calcium oxide, 0.1 mm particle size | 4.92 | 3.60 |
| Trimethylol propane trimethacrylate | 3.62 | 3.60 |
| 2,5-Dimethyl-2,5-di-(tert.butyl-peroxyhexyne)-3 (45%) | 0.50 | 0.60 |
| Polycarbodiimide/EVA copolymer | 0.91 | 0.91 |
| Diphenylamine derivative (70% amine/30% silica) | 0.91 | 0.91 |
| Liquid polybutadiene[2] | 17.00 | 12.00 |
| Liquid polybutadiene, MA derivative[4] | 17.00 | 12.36 |
| Surface condition after application[5] | Smooth, dry | Smooth, dry |
| Initial adhesion to oiled steel[6] | Cohesive failure | Cohesive failure |
| Adhesion after curing, 30 mins. 180° C. | Cohesive failure | Cohesive failure |
| Adhesion after curing, 30 mins./180° C. + 10 mins./230° C. | Cohesive failure | Cohesive failure |
| Surface condition after curing, 30 mins/180° C. | Compact, smooth, dry | Compact, smooth, dry |
| Surface condition after 30 mins./180° C. + 30 mins./230° C.[7] | Compact, smooth, dry | Compact, smooth, dry |

Remarks:
[1]Melt index 60
[2]Cis-1,4-polybutadiene ca. 72%, MW ca. 1800
[3]Polybutadiene with predominantly terminal OH groups, MW ca. 2800
[4]Polybutadiene/maleic anhydride adduct with statistically distributed succinic anhydride groups, MW ca. 1700, ca. 7.5 anhydride groups per molecule
[5]Material temperature on application ca. 80° C., condition after cooling
[6]Bodywork steel ST 1405 oiled with ASTM Oil No. 1 before stoving
[7]Corresponds to overstoving cycle Examples 1 to 3 are formulations according to the invention for a sealing compound. A similar sealing compound containing dioctyl adipate instead of the liquid polybutadienes was produced for comparison. Dioctyl adipate is recommended by manufacturers of EVA copolymers as a particularly suitable plasticizer. As the test results show, only the sealing compounds according to the invention have the surface condition required in particular for visible joints after the stoving process. The Comparison Example was based on prior-art information, i.e. the plasticizer did not contain any unsaturated components. The surface condition of this sealing compound is totally unsatisfactory after curing so that the compound is unusable. This applies in particular to samples subjected to a so-called overstoving cycle. This overstoving cycle simulates the maximum temperature occurring in paint drying ovens for electrophoretic coatings.

Example 4 is an example according to the invention of an expanding lining adhesive. On account of its expanding properties, this adhesive naturally has a porous internal structure after curing so that it is of only limited use as a sealing compound.

Examples 5 and 6 are examples according to the invention of a low-viscosity sprayable sealing compound. These test results also clearly show that sprayable sealing compounds according to the invention have a suitable surface condition for visible joints.

What is claimed is:

1. A hot-pumpable, heat-curing composition comprising:
   a) at least one ethylene vinyl acetate (EVA) copolymer having a softening point above 50° C., as measured by the ring and ball method according to ASTM E-28;
   b) an amount of at least one liquid reactive plasticizer containing olefinically unsaturated double bonds to make the composition applicable within a temperature range of 60° C. to 110° C.; and
   c) at least one peroxide crosslinking agent wherein the composition is tack free after application and cooling.

2. The composition of claim 1 wherein 4 to 40 percent by weight of said EVA copolymer is present.

3. The composition of claim 2 wherein 7 to 33 percent by weight of said EVA copolymer is present.

4. The composition of claim 1 wherein said liquid reactive plasticizer is selected from the group consisting of a butadiene homopolymer, an isoprene homopolymer, a copolymer of butadiene and isoprene, and a mixture thereof.

5. The composition of claim 4 wherein 5 to 40 percent by weight of said butadiene homopolymer, isoprene homopolymer, copolymer of butadiene and isoprene, or mixture thereof is present.

6. The composition of claim 5 wherein 14 to 35 percent by weight of said butadiene homopolymer, isoprene homopolymer, copolymer of butadiene and isoprene, or mixture thereof is present.

7. The composition of claim 4 wherein said copolymer comprises functional groups selected from the group consisting of hydroxy, amino, epoxy, carboxy, carboxylic anhydride, and mixtures thereof.

8. The composition of claim 1 further comprising a (meth)acrylate monomer.

9. The composition of claim 8 wherein 1 to 10 percent by weight of said (meth)acrylate monomer is present.

10. The composition of claim 9 wherein 3 to 6 percent by weight of said (meth)acrylate monomer is present.

11. The composition of claim 1 wherein 0.1 to 5 percent by weight of said peroxide crosslinking agent is present.

12. The composition of claim 11 wherein 0.5 to 1.5 percent by weight of said peroxide crosslinking agent is present.

13. The composition of claim 1 further comprising at least one auxiliary or additive selected from the group consisting of stabilizers, activators for peroxides, fillers, pigments, drying agents, and expanding agents.

14. The composition of claim 13 wherein up to 5 percent by weight of a stabilizer, up to 6 percent by weight of an activator for peroxides, 20 to 70 percent by weight of a filler, up to 5 percent by weight of a pigment, 1 to 10 percent by weight of a drying agent, and up to 3 percent by weight of an expanding agent is present.

15. The composition of claim 14 wherein 1 to 3 percent by weight of a stabilizer, 2 to 4 percent by weight of an activator for peroxides, 40 to 50 percent by weight of a filler, 1 to 3 percent by weight of a pigment, 3 to 5 percent by weight of a drying agent, and 0.5 to 1.5 percent by weight of an expanding agent is present.

16. A process for sealing rough or fine seams during the white-shell stage of vehicle manufacture comprising:
    a) assembling parts, optionally followed by welding, flanging, screwing or riveting;
    b) applying the composition of claim 1 as a sealing composition to at least one part, wherein said sealing composition has a temperature of from 60° C. to 110° C.;
    c) optionally cleaning or washing the joined parts;
    d) optionally pretreating at least one surface of said parts;
    e) applying an electrophoretic coating; and
    f) curing or crosslinking said sealing composition during stoving of paint applied by electrophoretic deposition, at temperatures of from 160° C. to 240° C.

17. The process of claim 16 wherein said composition of is applied in step b) at a temperature of from 70° C. to 100° C.

18. A process for lining sandwich parts in vehicle manufacture comprising:
    a) forming a lining adhesive comprising the composition of claim 11 further comprising an expanding agent;
    b) applying said lining adhesive to at least one part, wherein said lining adhesive is applied in step b) at a temperature of from 60° C. to 110° C.;
    c) assembling the parts, optionally followed by welding, flanging, screwing or riveting;
    d) optionally cleaning or washing the joined parts;
    e) optionally pretreating at least one surface of said parts;
    f) applying an electrophoretic coating; and
    g) curing or crosslinking said sealing composition during stoving ,of paint applied by electrophoretic deposition, at temperatures of from 160° C. to 240° C., wherein said expanding agent expands by 20 to 250 percent.

19. The process of claim 18 wherein said composition is applied in step b) at a temperature of from 70° C. to 100° C.

* * * * *

UNITED STATES PATENT AND TRADEMARK OFFICE
CERTIFICATE OF CORRECTION

PATENT NO. : 6,448,338 B1
DATED : September 10, 2002
INVENTOR(S) : Born et al.

It is certified that error appears in the above-identified patent and that said Letters Patent is hereby corrected as shown below:

<u>Column 10,</u>
Line 7, delete "claim 11, and insert therefor -- claim 1 --.
Line 19, after "stoving", delete ",".

Signed and Sealed this

Twenty-second Day of July, 2003

JAMES E. ROGAN
*Director of the United States Patent and Trademark Office*